(12) United States Patent
Kauschke et al.

(10) Patent No.: US 6,436,512 B1
(45) Date of Patent: Aug. 20, 2002

(54) NONWOVEN FABRIC WITH HIGH CD ELONGATION AND METHOD OF MAKING SAME

(75) Inventors: Michael Kauschke, Rimsting (DE); Mordechai Turi, Princeton Junction, NJ (US)

(73) Assignee: First Quality Nonwovens, Inc., State College, PA (US)

( * ) Notice: Subject to any disclaimer, the term of this patent is extended or adjusted under 35 U.S.C. 154(b) by 0 days.

(21) Appl. No.: 09/953,390

(22) Filed: Sep. 14, 2001

Related U.S. Application Data

(60) Division of application No. 09/613,469, filed on Jul. 10, 2000, which is a continuation-in-part of application No. 09/460,659, filed on Dec. 13, 1999, which is a continuation-in-part of application No. 09/373,826, filed on Aug. 13, 1999.

(51) Int. Cl.$^7$ .................................................. D04H 3/00
(52) U.S. Cl. ......................... 428/170; 442/328; 442/401
(58) Field of Search .............................. 162/100, 102, 162/109, 115, 116, 157.1, 211, 217, 296, 351, 363, 374, 383; 428/105, 113, 167, 170, 171, 218, 338; 442/327, 328, 366, 401; 156/166, 167, 180, 181, 441; 19/299; 604/358, 385.01; 256/517, 518, 557

(56) References Cited

U.S. PATENT DOCUMENTS

| | | | |
|---|---|---|---|
| 4,075,382 A | 2/1978 | Chapman et al. | 428/192 |
| 4,725,473 A | 2/1988 | Van Gompel et al. | 428/156 |
| 5,149,332 A | 9/1992 | Walton et al. | 604/358 |
| 5,369,858 A | * 12/1994 | Gilmore et al. | 28/104 |
| 5,482,765 A | 1/1996 | Bradley et al. | 442/382 |
| 5,543,206 A | 8/1996 | Austin et al. | 428/198 |
| 5,599,420 A | 2/1997 | Yeo et al. | 156/290 |

(List continued on next page.)

FOREIGN PATENT DOCUMENTS

| | | |
|---|---|---|
| DE | 4311867 A1 | 10/1994 |
| DE | 19620503 A1 | 11/1997 |
| DE | 19709352 A1 | 9/1998 |
| EP | 0776391 B1 | 1/1998 |
| EP | 0815819 A2 | 1/1998 |
| EP | 818569 A2 | 1/1998 |
| WO | WO 92/07984 | 5/1992 |
| WO | WO 95/16422 | 6/1995 |
| WO | WO 95/28280 | 10/1995 |
| WO | WO 96/09165A11 | 3/1996 |
| WO | WO 99/53877 | 10/1999 |
| WO | WO 9957355 | 11/1999 |

OTHER PUBLICATIONS

US Patent Application Publicaiton –US 2001/0053904 12–2001 Abuto 604/385.101.*

*Primary Examiner*—Peter Chin
*Assistant Examiner*—Eric Hug
(74) *Attorney, Agent, or Firm*—Amster, Rothstein & Ebenstein

(57) ABSTRACT

A nonwoven fabric from spun fibers wherein the density of the spun fibers in the fabric varies between strips of relatively high density and strips of relatively low density. The strips extend along the length of the fabric in the machine direction in an alternating pattern, with the high density strips separated from each other by low density strips. The alternating high density and low density strips provide the fabric with a higher percent elongation in the cross direction than in the machine direction. The alternating pattern is achieved through use of a pattern screen defining a plurality of elongated air permeable regions separated by elongated substantially or relatively air impermeable regions, the elongated regions extending in the machine direction in an alternating pattern, with the air permeable regions separated from each other by the substantially or relatively air impermeable regions.

10 Claims, 10 Drawing Sheets

U.S. PATENT DOCUMENTS

| | | | |
|---|---|---|---|
| 5,626,571 A | 5/1997 | Young et al. | 604/370 |
| 5,654,088 A | 8/1997 | Gupta et al. | 442/361 |
| 5,667,750 A | 9/1997 | Nohr et al. | 264/555 |
| 5,669,798 A | 9/1997 | Koczab | 442/362 |
| 5,695,868 A | 12/1997 | McCormack | 442/389 |
| 5,736,219 A | 4/1998 | Suehr et al. | 428/113 |
| 5,789,065 A | 8/1998 | Haffner et al. | 428/152 |
| 5,882,562 A | 3/1999 | Kozulla | 264/83 |
| 5,964,742 A | 10/1999 | McCormack et al. | |
| 6,030,686 A | 2/2000 | Suehr et al. | 428/113 |
| 6,277,479 B1 * | 8/2001 | Campbell et al. | 428/213 |

* cited by examiner

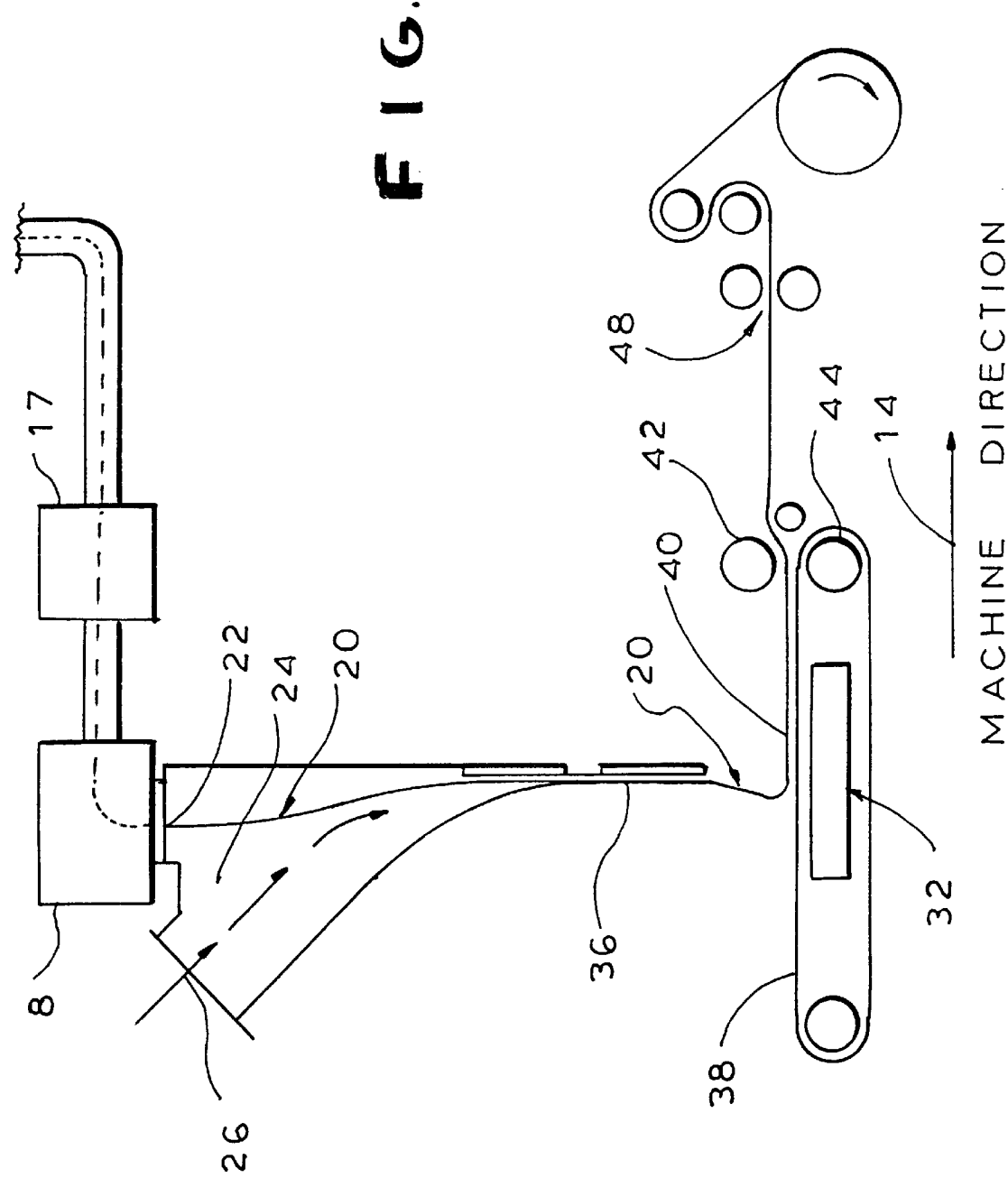

NONWOVEN FABRIC WITH HIGH CD ELONGATION AND METHOD OF MAKING SAME

CROSS-REFERENCE TO RELATED APPLICATION

This is a divisional of U.S. Pat. No. 09/613,469, filed Jul. 10, 2000; itself a continuation-in-part of U.S. patent application Ser. No. 09/460,659, filed Dec. 13, 1999, itself a continuation-in-part of U.S. patent application Ser. No. 09/373,826, filed Aug. 13, 1999.

BACKGROUND OF THE INVENTION

The present invention relates to a nonwoven having a filament density pattern yielding low tensile strength and high percent elongation in a first direction (e.g., CD) and high tensile strength and low percent elongation in a second direction (e.g., MD), and a method of making such a nonwoven.

Spunbond nonwoven fabrics are made of continuous strands or filaments that are laid down on a moving conveyor belt in a randomized distribution. In a typical spunbond process, resin pellets are processed under heat to a melt and then fed through a spinnerette to create hundreds of thin filaments or threads. Jets of fluid (e.g., a gas such as air) causes the threads to be elongated, and the threads are then blown or carried onto a moving web where they are laid down and sucked against the web in a random pattern to create a fabric. The filament density of the fabric is typically fairly uniform and symmetrically extending in both the machine direction (MD) and the cross direction (CD) (at least this is the goal). The fabric then passes through a bonding station. Bonding is necessary because the filaments or threads are not woven together.

Other nonwoven fabrics include fabrics made from staple fibers, meltblown fibers, carded fibers and short cut fibers. As used herein the terms "spun fibers" and "fibers" include the spun filaments described above as well as staple fibers, meltblown fibers, carded fibers and short cut fibers.

A non-uniform and non-symmetrical fiber density pattern could result in a fabric with an expected elongation in one direction (e.g., MD), but an unexpected increased elongation in the other direction (e.g., CD). This is desired in situations where minimal elongation is required in the machine direction and yet high elongation is required in the cross direction. For example, any elongation in the machine direction will disrupt the converting machines that are used to make diapers, while substantial elongation in the cross direction is desired to give each individual diaper some give around the wearer's waist.

Accordingly, it is an object of the present invention to provide a nonwoven fabric having a non-uniform fiber density pattern and a method of making such fabric.

Another object of the present invention is to provide a nonwoven fabric and method of making same wherein in one embodiment the fabric is highly extensible in a first direction (typically the CD) as compared to a second direction (typically the MD).

Another object of the present invention is to provide a nonwoven fabric and method of making same wherein in one embodiment the fibers of the fabric are oriented more in the MD than in the CD thereby providing higher tensile strength in the MD than in the CD.

Another object is to provide such a method and fabric wherein in one embodiment the nonwoven fabric has low tensile strength and high percent elongation in the first direction (typically the CD), and high tensile strength and low percent elongation in the second direction (typically the MD).

It is a further object to provide such a method and fabric wherein in one embodiment the density of the fibers in the fabric varies between strips of relatively high density and strips of relatively low density, the strips extending substantially continuously along the length of the fabric in the machine direction in an alternating pattern.

It is a still further object of the invention to provide such a fabric wherein in one embodiment less fibers are bonded together in the strips of relatively low fiber density than in the strips of relatively high fiber density.

It is a still further object of the invention to provide such a fabric which in one embodiment provides increase liquid wicking in the strips of relatively high fiber density and increased liquid strike-through in the strips of relatively lower fiber density.

It is a still further object of the invention to provide such a fabric which in one embodiment has a shrinkage differential between the strips of relatively high fiber density and the strips of relatively lower fiber density when the fabric is exposed to heat, with greater shrinkage in the strips of relatively high fiber density.

It is also an object of the present invention to provide such a method which in one embodiment is simple and economical to use and maintain.

It is an object of the present invention to provide an improved process for the method of manufacturing a nonwoven according to the present invention and an improved nonwoven wherein, in one embodiment, the design of the fluid impermeable and fluid permeable regions appears regular and a biasing thereof in one direction is difficult to discern by the ordinary viewer.

It is another object to provide such an improved process and nonwoven wherein, in one embodiment, the fabric defines both fluid flow highways of low thickness and parallel fluid flow barriers of high thickness, thereby to encourage fluid flow in the MD and retard fluid flow in the CD.

It is a further object to provide such an improved process and nonwoven wherein, in one embodiment, a composite fabric includes a nonwoven according to the present invention and an elastic film thereon, the composite exhibiting a reduced propensity for breaking of the bonding points upon stretching in the CD.

It is a still further object of the present invention to provide such an improved process wherein, in one embodiment, jets of a liquid fluid (rather than a gaseous fluid) impinge on the spun fibers in order to enhance redirection of the spun fibers.

SUMMARY OF THE INVENTION

It has now been found that the above and related objects of the present invention are obtained in a nonwoven fabric formed from spun fibers wherein the density of the fabric varies between strips of relatively high density and strips of relatively low density, the strips extending along the length of the fabric in the machine direction in an alternating pattern. The high density strips are separated from each other by low density strips, the alternating high density and low density strips providing the fabric with a higher percent elongation in the cross direction than in the machine direction. The method comprises the steps of forming a flowing stream of spun fibers and moving an air (or like fluid) permeable member over a suction box and across the path of the fiber stream to intercept and collect the fibers on one face of the air permeable member and to bond the collected fibers together to form a nonwoven fabric. A pattern screen is provided, the pattern screen defining a plurality of elongated air (or like fluid) permeable regions separated by elongated relatively air (or like fluid) impermeable regions, the elongated regions extending in the machine direction in an alternating pattern, with the air permeable regions separated from each other by the relatively air impermeable regions. The pattern screen is positioned in relation to the air permeable member and the suction box to cause the fibers to be collected on the one face of the air permeable member so as to form a fabric having a density that varies between strips of relatively high density and strips of relatively low density. The strips extend along the length of the fabric in the machine direction in an alternating pattern, with the high density strips separated from each other by low density strips, the alternating high density and low density strips providing the fabric with a higher percent elongation in the cross direction than in the machine direction. The collected fibers are then separated from the air pervious member.

In a preferred embodiment, the relatively air impermeable regions disrupt the air flow directly above the air pervious member, and the pattern screen comprises longitudinally extending and transversely spaced air impermeable baffle bars. The pattern screen is preferably below the suction box cover, in the plane of the suction box cover, between the suction box cover and the air permeable member, or part of the air permeable member (i.e., on the top of, on the bottom of or within the air permeable member).

The present invention also encompasses a method of making a nonwoven fabric embodying spun fibers deposited in a patterned formation providing a higher percent elongation in CD than in MD. The method comprises the steps of forming a flowing stream of spun fibers and air (or like fluid), and moving an air pervious member over a suction box cover and across the path of the fiber stream to intercept and collect the fibers on one face of the air pervious member. A pattern screen is disposed as the suction box cover, thereby to cause the fibers to be collected on the one face of the air pervious member in a pattern determined by the pattern on the pattern screen and to bond the collected fibers together to form a nonwoven fabric. The pattern defines an air pervious area/air impervious area ratio which is greater in MD than in CD, thereby to provide a fabric with a higher percent elongation in CD than in MD. The collected fibers are then separated from the air pervious member.

In a preferred embodiment, the pattern screen comprises longitudinally extending and transversely spaced substantially air impermeable baffle bars thereby to impose the pattern of the baffle bars on the suction exerted on the filaments by the suction box. The apertures of the air pervious member define a regular non-oriented pattern.

The present invention further encompasses an improved method of making the nonwoven fabric using a pattern screen wherein the elongated fluid permeable regions are configured and dimensioned as rhomboids elongated in the MD, or wherein a liquid (such as water) redirects the spun fibers in the formed web (with removal of the liquid being performed by a liquid discharge box rather than a suction box), or wherein the thickness of the fabric varies between strips of relatively high thickness (which act as speed bumps to fluid flow in the CD) and strips of relatively low thickness (which act as highways for fluid flow in the MD), or wherein an elastic polymeric film is coated (preferably cast coated) onto the fabric in the MD and the composite of the collected fibers and the elastic film is separated from the fluid permeable member. Preferably the fabric has an MD/CD density ratio of 1.1–10.0 (preferably 1.5–3.0) to 1.0. Preferably the thickness of the low thickness strips is only 10–90% (preferably 25–75%) of the thickness of the high thickness strips.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIG. 1 is a fragmentary schematic illustrating a spunbonding process;

DETAILED DESCRIPTION OF THE PREFERRED EMBODIMENTS

Figure 2A:
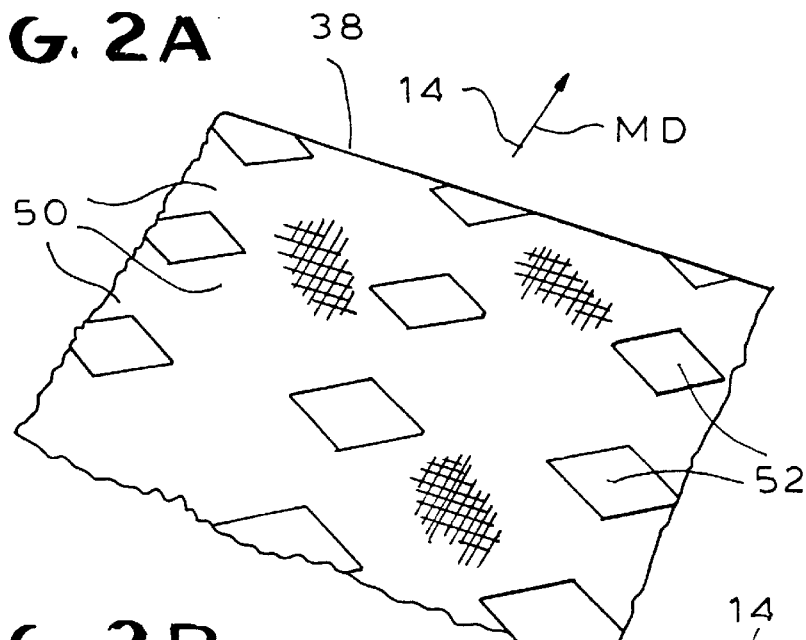
FIGS. 2A, 2B and 2C are fragmentary top plan views of an air permeable member (such as a conveyor) for use in the present invention.

Referring now to the drawing, and in particular FIG. 1 thereof, therein illustrated is a typical apparatus for making spunbond fabric out of plastic, such as polypropylene. Specifically, polypropylene pellets are processed under heat to a melt in heater 17 and then supplied to a spinnerette 18. The spinnerette 18 includes an outflow plate 22, with a plurality of holes. The melted polypropylene is forced through the many holes and forms hundreds of thin endless filaments or threads 20. Air 26 (injected through conduit 24)

is used to lengthen the filaments 20 and thin the diameter of the filaments 20. The filaments 20 are then laid down or "collected" on a moving air permeable member, such as conveyor belt 38 which travels over the suction box cover, and to bond the collected fibers together to form a nonwoven fabric 40. Fabric 40 then optionally passes through compaction rollers 42 and 44 and a bonding station 48.

A suction box 32 having a top or cover 32' is located under conveyor belt 38 and creates a vacuum to pull down the fibers 20 onto the belt 38 and to keep the air flow 26 moving in the downward direction. Accordingly, the conveyor belt 38 is porous or permeable to air, and the suction box top or cover 32' is also porous or permeable to air. Typically, the top of the prior art suction box (not shown) is a simple metal grating which is uniform in both the machine direction 14 (MD) and the cross direction 12 (CD) so that the resulting fabric is also uniform in both orthogonal directions. Similarly, the prior art belt (not shown) allows air flow in a uniform manner so that the spunbond filaments will lie flat on the belt in a random, but generally uniform, manner in both orthogonal directions. Since the air flow causes the filaments to lie down, any disruption in the air flow (such as a large spot of dirt on the belt or suction box cover) will result in fewer filaments directly above the spot.

It has now been found that in some instances it would be preferable to have a non-uniform lay-down of spun fibers (e.g. the spunbond filaments) on the belt in the cross direction. In order to achieve this, in a preferred embodiment a special suction box cover is utilized, which cover is not uniform when comparing the machine direction to the cross direction. Specifically, the suction box cover includes a plurality of air impermeable bars which all extend in the machine direction. These bars disrupt the vertical air flow with the result that the fabric formed on the web will have alternating lanes of more fibers and fewer fibers. The bars can be completely air impermeable or substantially air impermeable (e.g. the bars could be formed with small holes therein) so long as the bars cause a disruption of the air flow at the point where the fibers are laid onto the moving web. In essence, the fabric will be striped in the machine direction. By disrupting the air flow at the point where the fibers are laid onto the moving web or conveyor belt, lanes having a high density of fibers are juxtaposed next to lanes having a low density of fibers, all of these lanes running in the machine direction. The end result is a nonwoven fabric 40 which has the expected or standard tensile strength and percent elongation in the machine direction 14, but decreased tensile strength and increased percent elongation in the cross direction 12. This is desired where minimal elongation is required in the machine direction, but high elongation is required in the cross direction.

Referring now to FIG. 2A in particular, the air permeable member 38 serving as the conveyor belt for the collected filaments 40, according to the present invention, may be initially created as a pattern of air permeable perforated areas 50 and substantially or relatively air impermeable non-perforated areas 52 (the non-perforated areas 52 being designated by white diamonds or parallelograms and the perforated areas 50 being designated by cross-hatching). The non-perforated areas 52 are closer together along the MD 14 than along the CD 12. Accordingly, the effect of the conveyor belt 38 is to modify the suction exerted on the falling filaments 20 by the suction box 32 in such a manner that the filaments 20 will tend to congregate (and thereby assume a higher filament density or weight per unit area) in the MD extending rows formed by the air permeable perforated areas 50 relative to the CD extending columns formed by the air impermeable imperforate areas 52. The plurality of air permeable areas 50 extend along the length of the fabric in the AMD 14 and are transversely separated from one another in the CD 12 by the substantially or relatively air impermeable members 52 extending in the MD 14. Accordingly, the effect of the conveyor belt 38 is to modify the suction exerted on the falling filaments 20 by the suction box 32 in such a manner that the filaments 20 tend to congregate (and thereby assume a higher filament concentration), thus leading to a higher density of the fabric in the MD extending rows formed by the air permeable areas 50 relative to the CD extending columns formed by the substantially or relatively air impermeable areas 52. It will be appreciated that, as used herein and in claims, the term "density" is used in terms of weight per unit area (rather than weight per unit volume) and thus is proportional to thickness where the weight per cross-sectional unit is uniform.

Figure 2B:
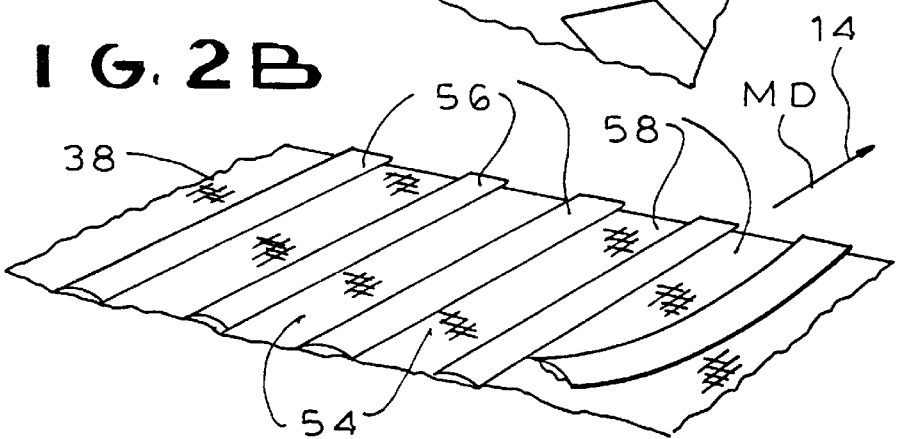

Referring now in particular to FIG. 2B, the conveyor belt 38 is based upon a generally uniform and symmetrically perforated sheet 54 of air permeable material to which has been added a series of endless substantially or relatively air impermeable strips or ribbons 56 which act to block the apertures of the sheet and prevent the passage of air therethrough. The plurality of ribbons 56 extend along the length of the fabric in the MD 14 and are transversely separated from one another in the CD 12 by ribbon-like air permeable areas 58 of the air permeable conveyor belt 38 extending in the MD 14. The substantially or relatively air impermeable areas 58 may be blocked out by applying suitable tape strips or ribbons 56 to the otherwise uniformly and symmetrically air permeable conveyor belt 38, such tapes 56 being adhesively or otherwise secured in place on the conveyor belt 38. The ribbons may be placed on either side of the belt 38, or formed within the belt.

Figure 2C:
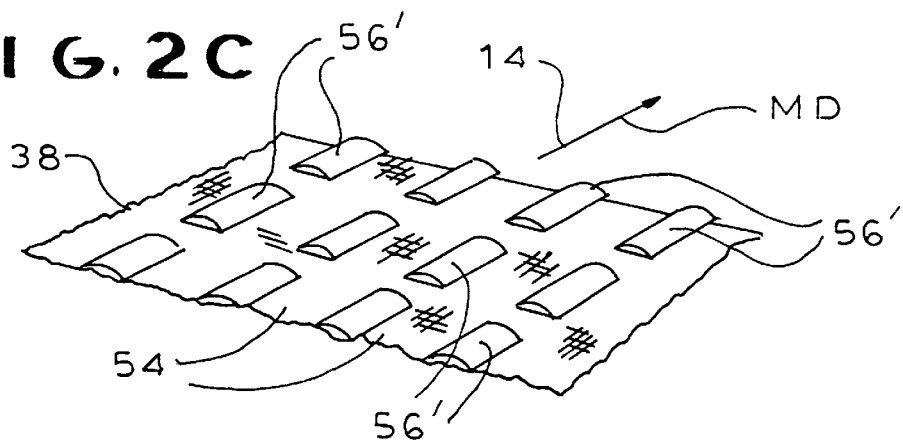

Referring now in particular to FIG. 2C, an alternative arrangement is shown wherein the conveyor belt 38 is based upon a generally uniform and symmetrically perforated sheet 54 of air permeable material to which has been added a series of broken or separated substantially or relatively air impermeable strips or ribbons 56' which act to block the apertures of the sheet and prevent the passage of air therethrough.

As will be obvious to those skilled in the art, different patterns than diamonds (FIG. 2A) or endless or broken ribbons (FIGS. 2B and 2C) may be used to define the substantially or relatively air impermeable portions of the air permeable member. The width of the diamonds or ribbons will determine the width of the strips of alternating high and low fiber density lanes in the resulting fabric. This in turn will determine the amount of elongation in the CD versus MD. Wider lanes of low density and narrower lanes of high density (all extending in the fabric MD) will result in increased elongation and decreased tensile in the CD as compared to the MD. It will be appreciated that the conveyor belts illustrated in FIGS. 2A, 2B and 2C are the functional equivalent of a laminate of a uniformly and symmetrically air permeable conveyor belt and a pattern screen defining substantially or relatively air impermeable areas.

Whether the conveyor belt is specially made to provide a particular pattern of air permeable areas 50 and substantially or relatively air impermeable areas 52 (as illustrated in FIG. 2A), or whether an initially regularly and symmetrically apertured conveyor belt is later specially modified by the placement of substantially or relatively air impermeable ribbons thereon to provide such air permeable areas 58 and substantially or relatively air impermeable areas 56 (as illustrated in FIGS. 2B and 2C), the reliance on a specially manufactured or specially modified conveyor belt could have disadvantages. In particular, the specially formed or specially modified conveyor belts are more expensive. Further, changing of a conveyor belt so as to modify the substantially or relatively air impermeable pattern imposed thereon is time consuming and results in idle time. The time required for pattern changing, and idle time of the apparatus because of such conveyor changing, may be held to a minimum by use of the preferred embodiments of the present invention described hereinbelow.

Figure 3:
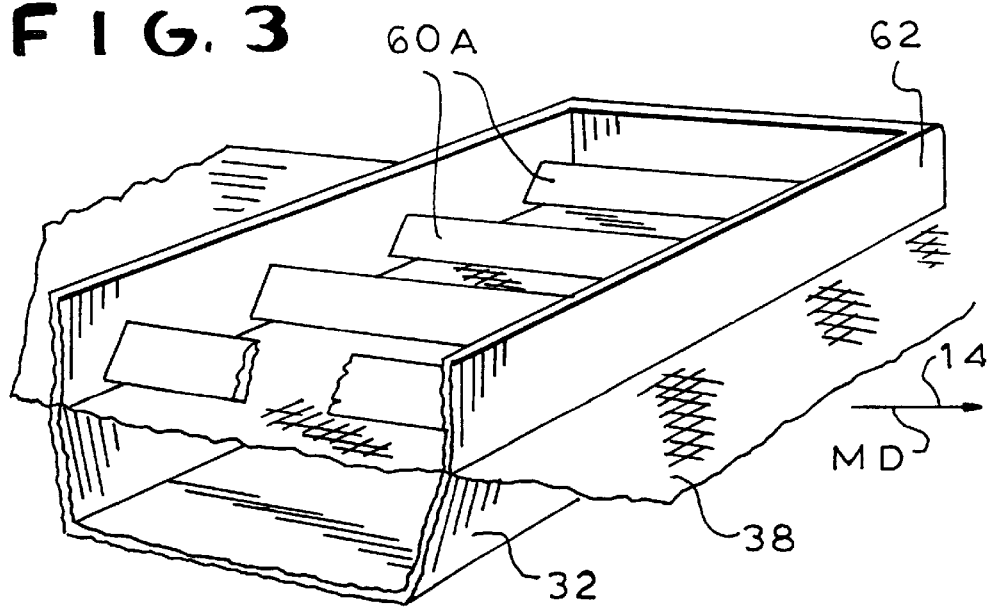
FIG. 3 is a fragmentary isometric view of a suction box providing air impermeable members above the suction box and above the conveyor belt.
Figure 4:
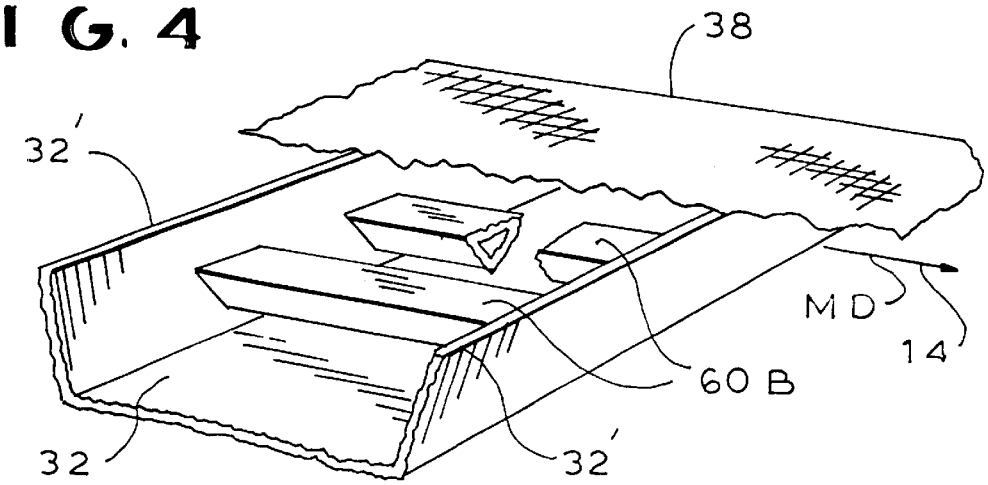
FIG. 4 is a fragmentary isometric view of a suction box providing air impermeable members within the suction box and below the conveyor belt.
Figure 5:
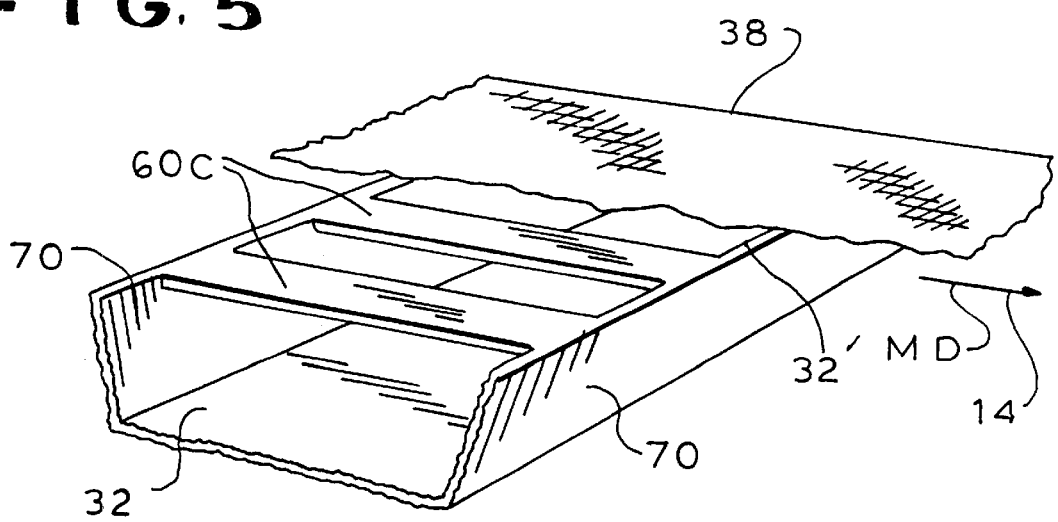
FIG. 5 is a fragmentary isometric view of a suction box having air impermeable members as the suction box cover.

Referring now to FIGS. 3–5, therein illustrated are various suction boxes 32 which can be used, either with conventional conveyor belts 38 defining regular and uniform air permeable patterns or with conveyor belts 38 according to the present invention defining non-regular and non-uniform air permneable patterns. The suction box of FIG. 3 may be used with staple fibers, meltblown fibers, carded fibers or short cut fibers, but is not well suited for use with endless spunbond filaments.

Referring now to FIGS. 3 and 4 in particular, a series of substantially or relatively air impermeable baffle bars 60A extend longitudinally in the MD and are transversely spaced across the CD. While the baffle bars 60A are illustrated as being V-shaped in cross section, clearly they may alternatively be flat, triangular shaped, or the like, so long as they cause fibers 20 to be deposited primarily in the vertically aligned areas between the baffle bars 60A rather than the areas vertically aligned with the baffle bars 60A. As illustrated in FIG. 3, in connection with staple fibers, meltblown fibers, carded fibers and short cut fibers, the baffle bars 60A may be supported, spaced above the conveyor belt upper surface, by a suitable framework such as the upstanding walls of a housing 62 which encloses the area of potential fiber deposition on the conveyor belt 38 above the suction box 32. At least a small amount of such fibers will be carried under such baffle bars 60A and thence onto the permeable member 38 by air currents so that even the low fiber density areas (that is, the band areas vertically aligned with the baffle bars 60A) will contain sufficient fibers so that the fabric 40 formed by the deposited fibers may eventually be stripped off the conveyor belt 38 in one piece.

While FIG. 3 illustrates the baffle bars 60A being disposed above the conveyor belt 38, FIG. 4 illustrates the baffle bars 60B being disposed beneath the conveyor belt 38 and within the suction box 32, preferably slightly below the plane of the suction box cover 32. It is well within the competence of those skilled in the art to ascertain a proper placement of the baffle bars 60B within the suction box 32 so as to form the desired alternating strips of high- and low fiber density lanes alternating across the CD. For example, the width of the strips of alternating high and low fabric density lanes are determined by the width of the baffle bars 60A, 60B and 60C and the gap between adjacent bars. Wider baffle bars (and smaller gaps therebetween) will result in wider lanes of low fabric density and narrower lanes of high fabric density, yielding an increase in elongation in the CD and a decrease in tensile strength in the CD. The width of the strips of alternating high and low fabric density lanes is also determined by the distance of the baffle bars 60B and 60C from the web 38. For a given baffle bar width, if the bars are moved closer to the web, then the lanes of fabric density will be increased in width and the lanes of high fabric density will be decreased in width.

Referring now to FIG. 5 in particular, therein illustrated is a suction box 32 wherein the cover 32' thereof defines a plurality of substantially or relatively air impermeable baffle bars 60C longitudinally extending in the MD and transversely spaced in the CD. Conceptually, the suction box cover 32' is essentially a plane that extends across the upper edges of the suction box sidewalls 70. Conventionally, a prior art suction box cover 32' is either completely open, so that there is no impediment to air flow therethrough, or uniformly and symmetrically perforate (permeable), so as to not impart any differential in fiber concentration along the MD and CD directions. However, in a preferred embodiment according to the present invention, as illustrated in FIG. 5, the suction box cover 32' defines a non-uniform and non-symmetrical pattern of substantially or relatively air impermeable baffle bars 60C and thus acts to influence the density of filament deposition on the conveyor belt 38 passing thereover. While the baffle bars 60C are illustrated in FIG. 6 as being of rectangular cross section, clearly they could be of triangular cross section (like the baffle bars of FIGS. 3 and 4), circular, etc.

The baffle bars of FIGS. 3–5 may be easily and rapidly changed so as to minimize downtime of the suction box and related apparatus and, at the same time, avoid the time consumption and expense associated with a need to change the actual conveyor belt.

Accordingly, whether the substantially or relatively air impermeable pattern screen is disposed below the suction box cover (i.e., bars 60B within the suction box, as in FIG. 4), in the plane of the suction box cover (bars 60C, as in FIG. 5), or between the suction box 32' cover and the air permeable member 38 (i.e., bars 60A above the suction box, as in FIG. 3), or is an initial or added air impermeable part of the air permeable member 38 (i.e., areas 52 or strips 56, as in FIGS. 2A and 2B, respectively), in effect the pattern screen defines substantially or relatively air impermeable regions (longitudinally extending in the MD and transversely spaced in the CD) which disrupt the air flow directly above the air permeable member and cause the fabric to have strips of relatively high fiber density and strips of relatively low fiber density, the strips extending along the length of the fabric in the MD direction in an alternating pattern across the CD. The high density strips are separated from each other by low density strips, the alternating high density and low density strips providing the fabric with a higher percent elongation and lower tensile strength in the CD than in the MD. While the pattern screen is positioned in relation to the air permeable member and the suction box, the optimum positioning thereof for any given application may be determined by routine experimentation, as discussed above.

Figure 6:
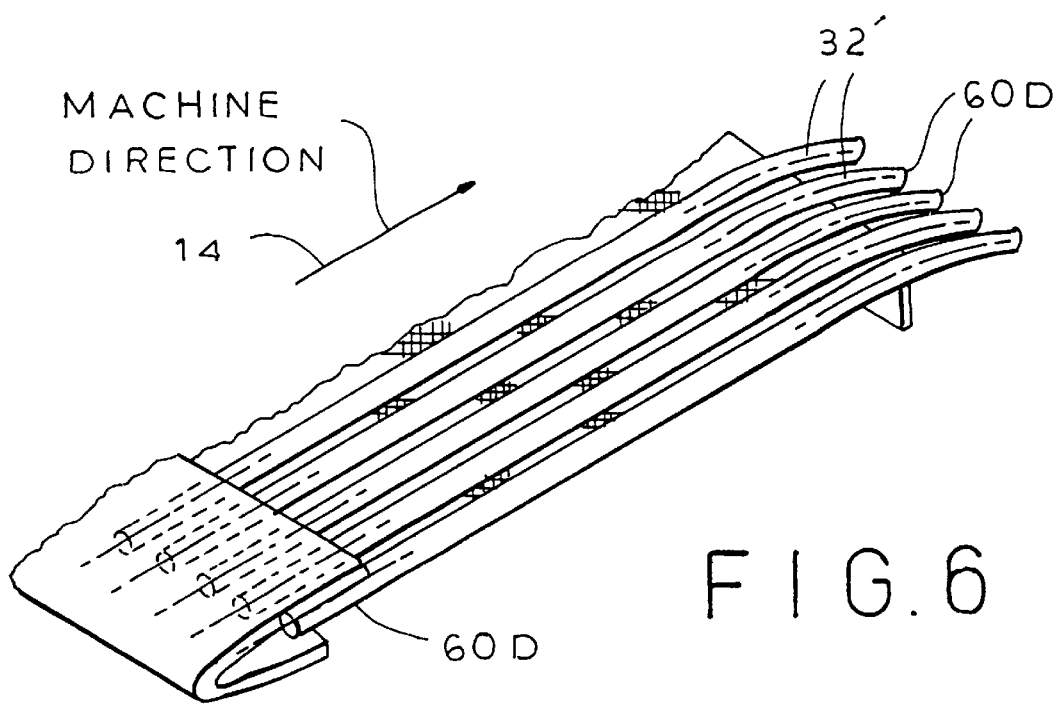
FIG. 6 is a fragmentary isometric view of a suction box cover having air impermeable bars in the nature of circular rods extending in the machine direction and being spaced apart in the cross direction.
Figure 7:
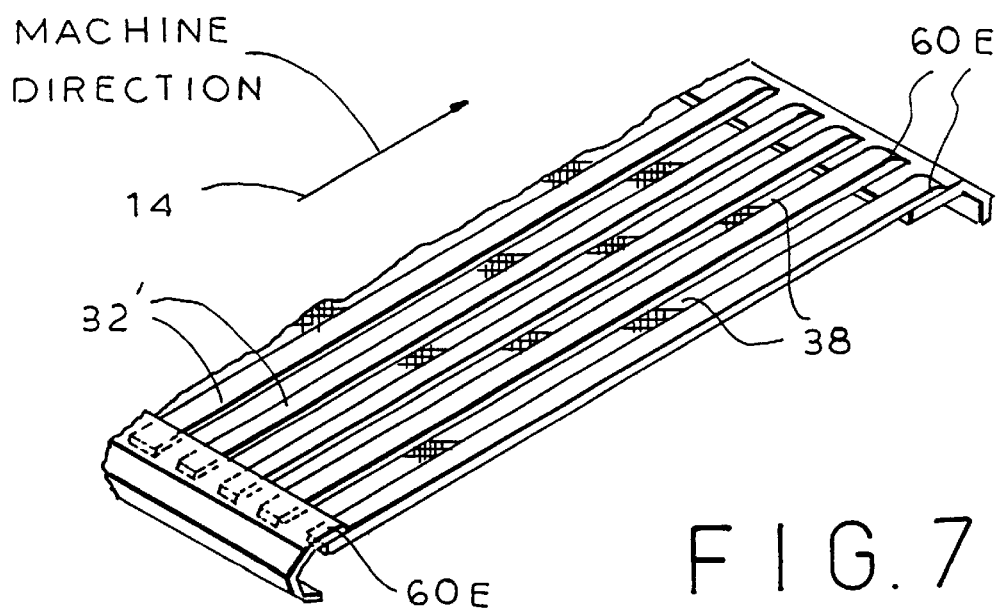
FIG. 7 is a top plan view of a suction box cover having air impermeable bars in the nature of flat strips extending longitudinally in the machine direction and being spaced apart in the cross direction.

Referring now to FIGS. 6 and 7 in particular, therein illustrated are preferred embodiments of the suction box cover 32' of the present invention similar to FIG. 5 (wherein the substantially or relatively air impermeable baffle bars 60C are disposed in the plane of the suction box cover 32'). FIG. 6 illustrates the baffle bars as circular rods 60D, and FIG. 7 illustrates the baffle bars as flat strips 60E. In both instances, the substantially or relatively air impermeable bars 60D, 60E extend axially or longitudinally in the MD 14 and are spaced apart in the CD 12.

As illustrated, the baffle bars 60D, 60E are journaled into the suction box cover 32' at their ends. While the suction box cover 32' may be air permeable throughout, as illustrated the sides of the suction box cover into which the baffle bars 60D, 60E are journaled may be formed of a solid, air impermeable material or of a material with a restricted air flow, while the rest of the suction box cover 32' underneath the bars is uniformly and regularly unrestricted air permeable. The baffle bars may be rotatable or fixed relative to the suction box cover 32'. By way of example, the diameter (width) of the baffle bars 60D (shown in FIG. 6) are 10 mm and the gap between adjacent bars is also 10 mm. Similarly, the width of the baffle bars 60E (shown in FIG. 7) are 10 mm and the gap between adjacent bars is also 10 mm. The web travels directly above the bars so the distance between the bars and the web is effectively zero. This arrangement will typically result in a fabric having lanes of high density approximately 13 mm in width and lanes of low density approximately 7 mm in width. The ratio of weight of the high density lanes to the low density lanes is preferably in the range of 70 to 85% for the high density lanes versus 30 to 15% for the low density lanes, although ranges of 55 to 95% for high density and 45 to 5% for low density are possible.

Utilizing the arrangement shown in FIGS. 6 and 7, nonwoven fabrics of 10 and 15 gsm (grams per square meter) were prepared and tested for both elongation and tensile strength utilizing the EDANA test method ERT 20.2–89. The tests yielded the following results:

|  | FIG. 7/FIG. 6 | FIG. 7/FIG. 6 |
| --- | --- | --- |
| Basis Weight | 10 gsm | 15 gsm |
| CD tensile N | 8.76/9.51 | 15.19/17.06 |
| CD elongation % | 62.85/57.64 | 67.13/60.07 |
| MD tensile N | 20.28/15.67 | 33.12/21.18 |
| MD elongation % | 47.22/43.13 | 57.43/45.52 |

Figure 8:
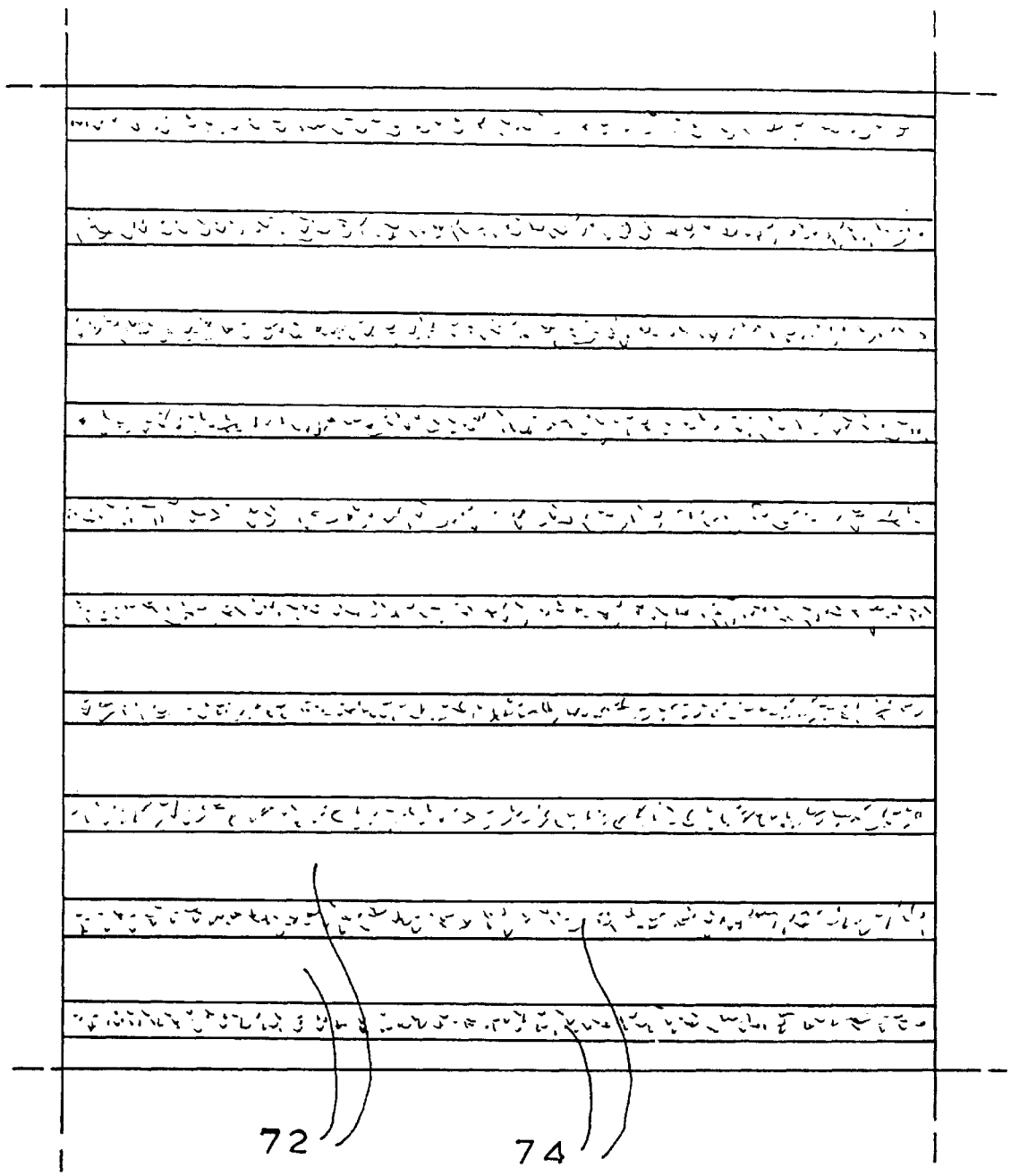
FIG. 8 is a top plan view of the fabric of the invention.

FIG. 8 is shows the fabric of the invention with the high density lanes 72 and the low density lanes 74.

The fabric of the present invention is highly extensible in the first direction (CD) as compared to the second direction (MD). The method of making the fabric of the invention results in the fibers of the fabric being oriented more in the MD than in the CD thereby providing higher tensile strength in the MD than in the CD. Further, in the fabric of the invention fewer fibers are bonded together in the strips of relatively high density than in the strips of relatively low density, thereby providing higher elongation and less tensile in the CD than in the MD.

The fabric of the invention provides increased liquid wicking in the strips of relatively high density and increased liquid strike-through in the strips of relatively lower density. The fabric can be used as CD extensible outer cover material for diapers and the like. The fabric of the invention can be made as described above with multiple spinning positions and suction boxes to increase the thickness of the resulting fabric.

As used herein, "elongation" refers to the percentage elongation of a specimen at the breakpoint, and "tensile" refers to the ultimate tensile strength of a specimen at the breakpoint.

As will be appreciated by those skilled in the art, in order to effect changes in both the MD and CD properties, variations in the preliminary compositions, bonding parameters, and thermodynamic parameters (e.g., the spinning, quenching, cooling and drawing parameters) may be used. Such parameter changes affect both the MD and CD properties. By way of contrast, only the formation of the density pattern of the present invention minimizes the properties in one direction, while maximizing the properties in the other direction.

Once formed, the nonwoven fabric of the present invention is typically subjected to uniform and symmetrical bonding of the substantially randomly oriented fibers in both the MD and CD so that any distinction between the MD and the CD properties arises out of the selective density process of the present invention. However, the selective density process of the present invention may also be applied to a nonwoven fabric which will be bonded asymmetrically in the MD and the CD. (See the inventor's co-pending U.S. patent application Ser. No. 09/374,825 filed Aug. 13, 1999 and entitled "Nonwoven With Non-Symmetrical Bonding Configuration.") Where the selective bonding pattern promotes a greater percent elongation in the CD than in the MD, then the use of non-uniform density of the initial nonwoven fabric merely enhances the elongation ratio (that is, increases the ratio of elongation in the CD to elongation in the MD). Where the selective bonding pattern of the nonwoven fabric promotes a greater percent elongation in the MD than in the CD, then the non-uniform density of the present invention must be effective to overcome the initial bias and still cause the fabric to have a greater percent elongation in the CD than in the MD.

A preferred embodiment of the present invention provides a method of making a nonwoven fabric from spun fibers wherein the density of the fabric varies between strips of relative high density and strips of relatively low density, the strips extending along the length of the fabric in the machine direction in an alternating pattern, with the high density strips separated from each other by low density strips. The alternating high density and low density strips across the cross direction provides the fabric with a higher percent elongation in the cross direction than in the machine direction.

Figure 9A:
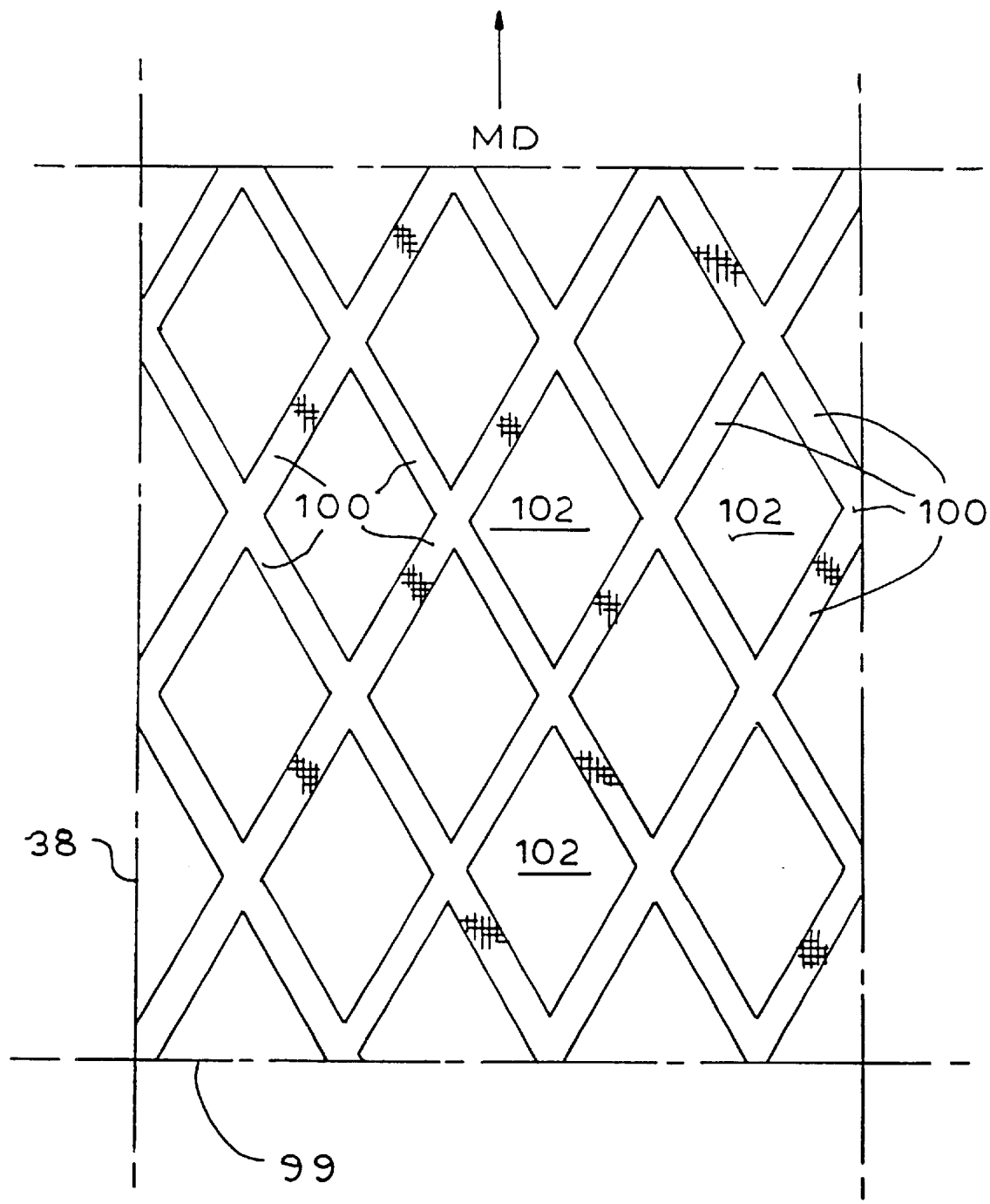
FIGS. 9A and 9B are top plan views of a pattern screen using a homboid design and the resultant fabric, respectively.
Figure 9B:
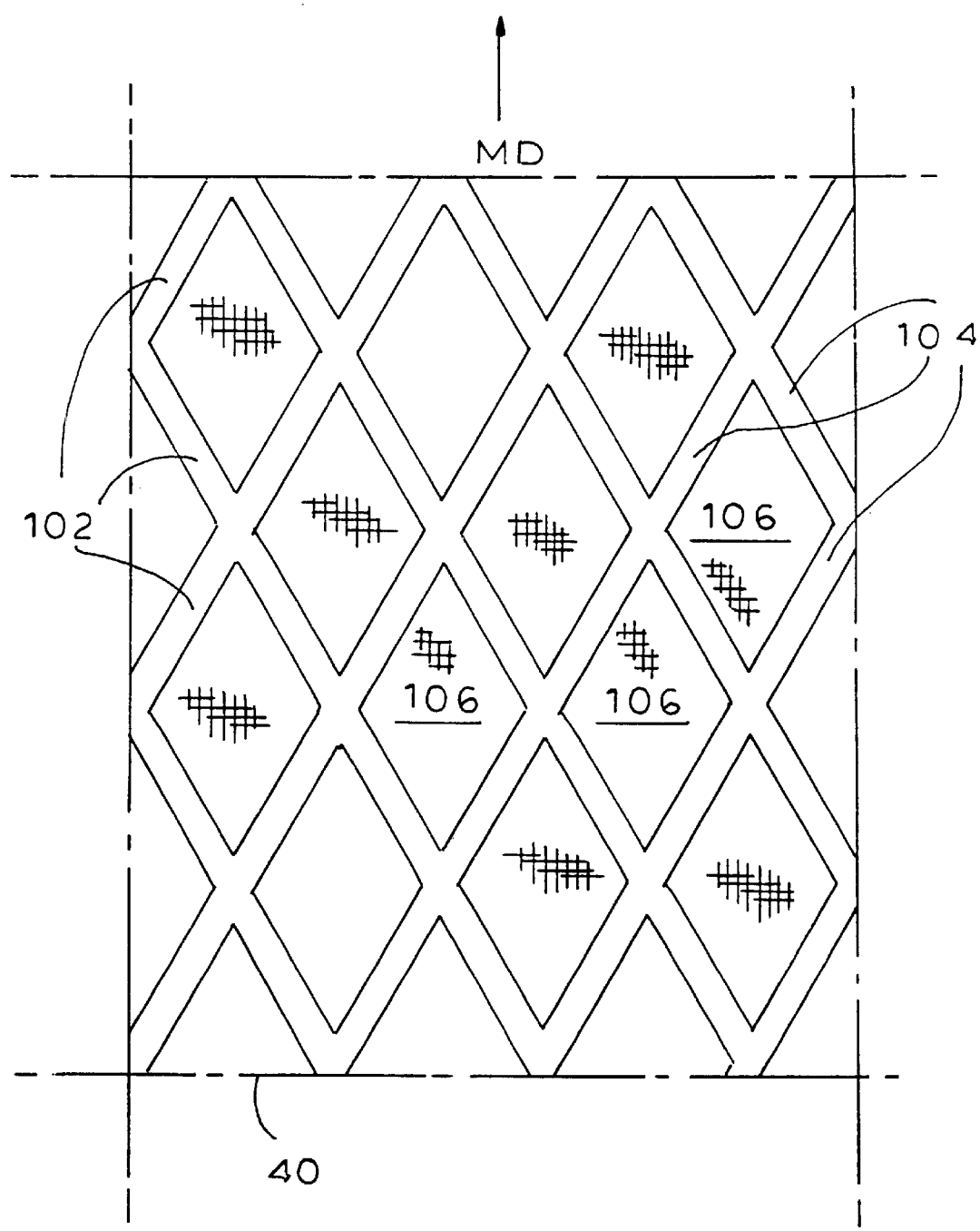

Referring now to FIGS. 9A and 9B in particular, in an improved preferred embodiment of the present invention, the pattern screen 99 (e.g., the cover 32' of the suction box 32) includes a plurality of elongated fluid permeable regions configured and dimensioned as open or hollow rhomboids 100 elongated in the first or machine direction, as best seen in FIG. 9A. The open rhomboids 100 in the pattern screen act as empty streets to delineate closed or filled rhomboids 102 which act as solid blocks (surrounded by the streets) to form a uniform distributed network. In the closed rhomboids 102 there will be a diminished build-up of fibers in the fabric relative to an increased build-up of fibers in the fabric occurring in the open rhomboids 100. The resultant fabric 40 illustrated in FIG. 9B has closed rhomboids 104 and open rhomboids 106 (corresponding to the open and closed rhomboids 100 and 102, respectively, of the pattern screen 99 illustrated in FIG. 9A).

Where the pattern of the pattern screen 99 is formed by open rhomboids 100 defining the elongated fluid permeable regions, the asymmetric nature of the patterning on the final fabric 40, as best seen in FIG. 9B, is difficult to discern visually relative to a regular and uniform pattern formed by rhombuses (i.e., non-elongated or equilateral parallelograms). The use of circles and ovals instead of rhombuses and rhomboids is more noticeable to viewers, presumably because the eye can more readily detect a lack of perfect circularity than a minor elongation of a rhombus, but such use is within the scope of the present invention. Accordingly, while the elongated figure is described hereinbelow as a rhomboid or ellipse (or oval), clearly any figure elongated in the MD may be used instead. The main axis of the elongated figure should form an angle of less than 45° with the MD. Each of the elongated figures along a given MD axis may have their axes of elongation parallel to one another or each of an adjacent pair of elongated figures may have their axis of elongation substantially transverse to one another. In either case, the elongation along the MD of the closed elongated FIG. 102 in the pattern screen 99 ensures a diminished lay down of fibers along the CD (relative to the MD).

Where the pattern on the pattern screen is formed by rhombuses or circles, the MD/CD density ratio of the fabric is 1 or unity. Where the pattern is formed by rhomboids (i.e., parallelograms with unequal adjacent sides) or ellipses (or ovals) elongated in the direction of the MD, then the MD/CD density ratio of the fabric will be higher than unity and the CD elongation will be greater than the MD elongation. Conversely, where the pattern is formed by rhomboids or ellipses (or ovals) shorter in the direction of the MD (e.g., squat relative to the rhombus or circle), then the MD/CD density ratio of the fabric will be lower than unity and the CD elongation will be less than the MD elongation. The resulting MD/CD density ratio of the fabric 40 is typically in the range of 1.1–10.0 (preferably 1.5–3.0) to 1.0. It will be appreciated that, even if a spunbond is not present in the fabric, there will always be a sufficient number of fibers connecting the various rhomboids or ellipses to hold the web together.

The open rhomboids 100 of the pattern screen 99 (FIG. 9A) may be used by themselves in straight or even undulating lines substantially aligned with the MD to define the fluid permeable strips of the suction box cover, simply because the open rhomboids 100 are elongated in the MD and the closed rhomboids 102 defining the fluid impermeable areas are either not elongated in the MD or are elongated in the MD less than the rhomboids 100 in the fluid permeable strips. Indeed, the closed rhomboids 104 defining the fluid permeable areas of the fabric and corresponding to the open rhomboids 100 of the pattern screen 99 may be rhombuses (that is, open equilateral parallelograms which are not elongated in any direction).

It will be appreciated that the pattern screen 99 may be a part of the suction box cover 32' (that is, in the plane of a suction box cover or below or above the suction box cover), only where it moves with the conveyer belt 38 relative to the suction box 32. Preferably it is an integral part of the conveyor belt 38.

Figure 10A:
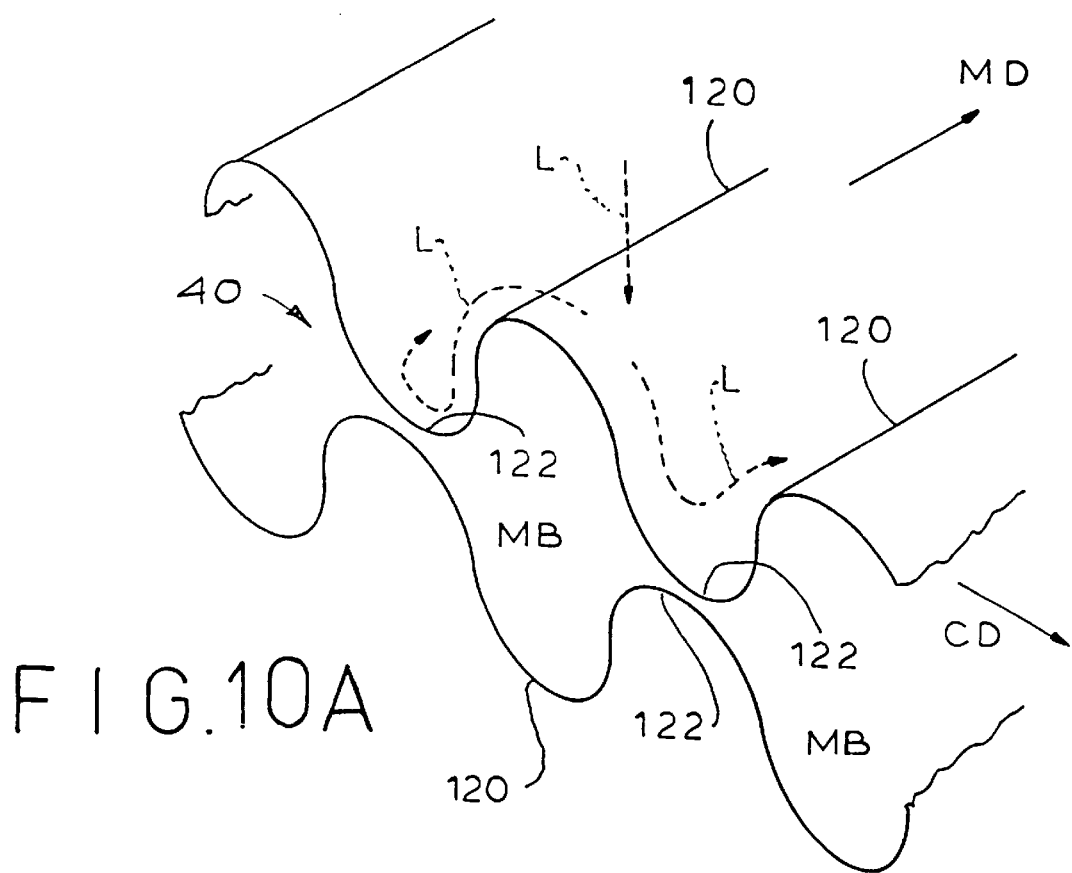
FIG. 10A is a fragmentary isometric view of a fabric having shallow fluid flow highway lanes and thicker fluid flow barrier lanes.
Figure 10B:
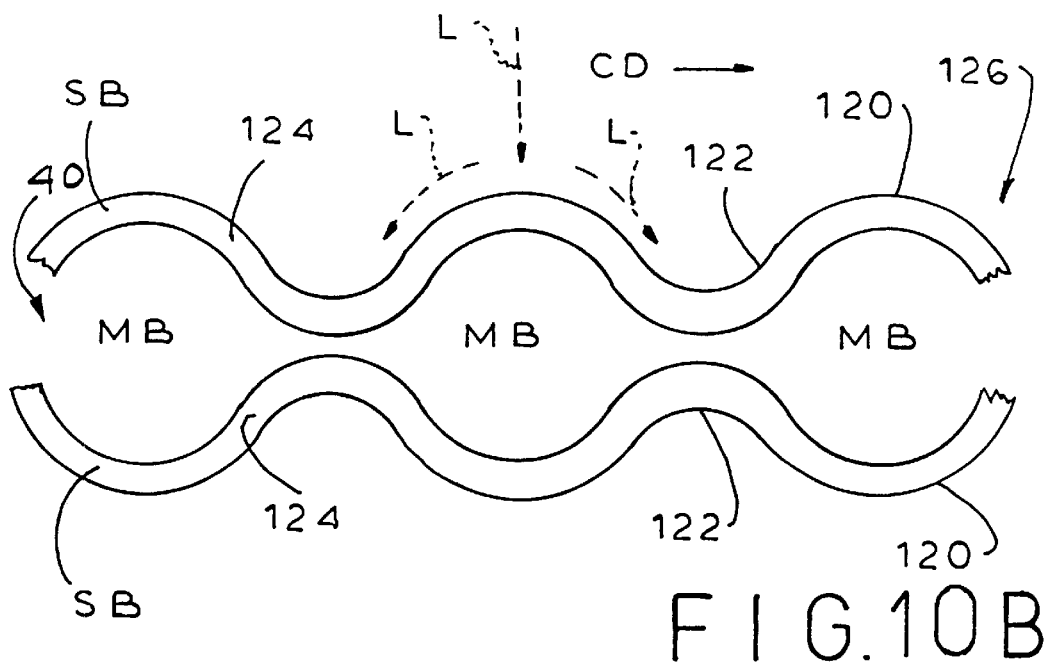
FIG. 10B is a fragmentary end elevational view of the nonwoven of FIG. 13A with a spunbond layer of constant thickness applied to each side thereof.

Referring now to FIGS. 10A and 10B in particular, in another improved preferred embodiment of the present invention, the nonwoven 40 is preferably a meltblown. The thickness of the meltblown fabric 40 varies between strips of relatively high thickness 120 (comparable to the previously described air impermeable strips 56, 102 in the pattern screen 99) and strips of relatively low thickness 122 (comparable to the previously described air permeable strips 58, 100 in the pattern screen 99). The strips 120, 122 extend along the length of the fabric in the MD in an alternating pattern with the high thickness strips 120 separated from each other by low thickness strips 122. The alternating high thickness and low thickness strips 120, 122 provide the fabric with a lower fluid flow rate in the CD than in the MD. The high thickness strips 120 act as fluid flow barriers to CD flow and are separated from each other by the low thickness strips 122 which act as fluid flow lanes or highways in the MD. The presence of the fluid flow barriers 120 (that is, the high thickness strips extending in the MD) provide the fabric with a lower fluid flow rate in the CD than in the MD. The high thickness strips 120 may be thought of as speed bumps extending along the MD. The speed bumps 120 resist the flow of fluid transverse thereto(in the CD), while encouraging the flow of fluid parallel thereto (in the MD) along the fluid flow highways 122 and intermediate a pair of adjacent speed bumps 120. Accordingly, liquid flow will occur initially in the MD, and then, only if it overflows the fluid flow barriers 120, in the CD.

This construction is especially useful when high strikethrough is desired so that a large quantity of fluids may be rapidly spread out along the MD of the fabric, as may be necessary in a diaper, catamenial pad, or like device subject to liquid flushes. The degree of strikethrough is related to the density of the various lanes (low thickness lanes 122 being characterized by a lower density, and high thickness lanes 120 being characterized by a higher density), how long the liquid remains in contact with the different lanes (longer for the low thickness lanes and shorter for the high thickness lanes), etc. Careful selection of the relative thicknesses of the various parallel lanes enables the manufacturer to provide a desired dispersal pattern for even massive impacts of liquid L on the fabric (as in a "flush" or burst of urine or blood). The thickness differential is 10–90%, preferably 25–75%, of the speed bump 120.

The meltblown nonwoven (MB) defining the parallel lanes may be used by itself, as illustrated in FIG. 10A, or in combination with a spunbond nonwoven (SB) 124 on one side or a spunbond nonwoven 124, 124 on each side (that is, in an SM or SMS material), as illustrated in FIG. 10B. Indeed, one outer surface of the SM or SMS material may be covered with an outer layer to provide smoothness where this is desirable (for example, in an acquisition layer or a topsheet). Assuming that the spunbond 124 is applied at a constant thickness to a meltblown 40 of undulating thickness, the laminate 126 of the spunbond(s) and the meltblown exhibits a higher liquid strikethrough in the low thickness or highway lanes 122 (since there is less meltblown there), and a lesser liquid strikethrough in the high thickness or barrier lanes 120 (since there is more meltblown there). Alternatively, the spunbond or other nonwoven material 124 may be applied to the meltblown material 40 in an undulating thickness corresponding, for example, to the undulating thickness of the meltblown material 40. Thus the lanes of low thickness 122 and high thickness 120 may be found in the spunbond or other nonwoven material 124 just as in the meltblown material 40. Other nonwoven material, such as nonwoven staple fibers (i.e., fibers of limited length), may replace the spunbond.

This material has special utility in diapers, catamenial pads and like absorbent hygiene products as a core wrap material or a fluid distribution and wicking layer. If necessary, the material may be reinforced for this purpose by bonding a core wrap material (according to the present invention) with an initially separate fluid distribution and wicking layer or by using both a core wrap material layer (according to the present invention) and a fluid distribution and wicking layer.

Figure 11:
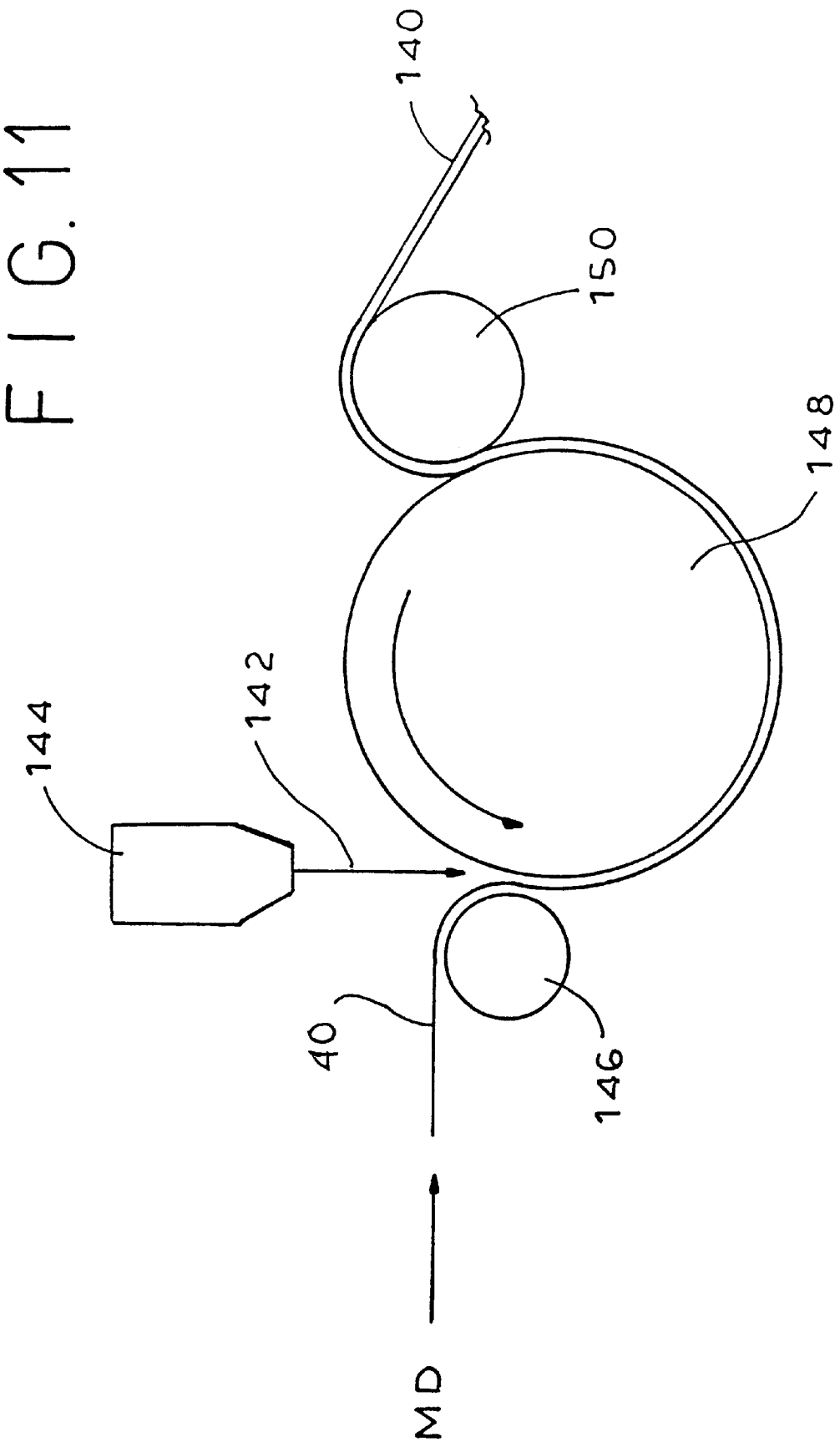
FIG. 11 is a fragmentary schematic view of the process for casting an elastic film onto the nonwoven.

Referring now to FIG. 11 in particular, in another improved preferred embodiment of the present invention, composites or laminates 140 are provided of one of the above-described nonwoven fabrics 40 and an elastic film 142.

Disposable absorbent articles typically contain a number of different functional layers of nonwovens or composites of nonwovens and elastic film-forming polymers. Each of these layers has to meet specific requirements as to their properties since they are under stress, tension and deformation conditions during converting on the assembly or manufacturing line as well as during later use. The fibrous nonwovens provide strength to the composite as well as a soft, textile, dry feeling to at least one of the surfaces of the composite. The elastic polymer film gives certain elasticity and recovery characteristics after deformations both during converting and during later use of the absorbent article incorporating the same. A breathable elastic polymer film further gives a liquid (water) impermeability and a gas (water vapor) permeability. The problem is that the useful combinations of nonwovens and elastic films are limited to those with physical (i.e., mechanical) characteristics which are similar or at least comparable; otherwise, the structure of the composite would fracture or delaminate under stress conditions during converting or use—that is, would suffer breaking of the bonding points between the film and the nonwoven or creation of loose or broken filaments in the nonwoven.

In this process modification, an elastic film 142 is coated onto a nonwoven 40 according to the present invention, preferably using a cast film production method (i.e., direct extrusion of a molten film-forming elastic polymer 142 from a die 144 onto the fabric 40). In casting, the elastic film 142 is applied from a die 144 onto the nonwoven 40, the composite 140 then passing between a nip roll 146 and a chill roll 148 (to cool the film) before removal of the cooled composite from the chill roll 148 by a peel roll 150. The cast film has a molecular orientation in the MD. Casting of the elastic film 142 directly onto the nonwoven 40 is preferable to each being separately formed and then glued or otherwise adhered together as a laminate as it avoids the danger inherent in the use of glue (which may seal the pores required for breathability of the composite).

The elastic film/nonwoven composite 140 according to the present invention responds at least to limited CD deformations without a failure in either of the components thereof and without delamination of the elastic film and nonwoven composite. The composite 140 exhibits impact resistance capabilities to allow high impact microdeformations to occur without failures or fractures.

The elastic film/nonwoven composites 140 of the present invention are particularly suited for use in a variety of industrial application (such as house wrapping, surface protection/low friction layers, packaging, furniture and bedding, car covers and shoe components), a variety of hygiene applications (such as back sheet/outer covers, wastebands, stretch pants and elastic or extensible side bands), and a variety of medical application (such as surgical drapes, surgical gowns, cut-in-place gowns and sterilization wrappings).

Where the composite 140 has a low CD tensile strength, high CD elongation, and low deformation energy consumption, it may be used as a chassis material for disposable diapers and catamenials or as "stretch tabs" for the closure systems or "side panels" of diapers. Where the film 142 is liquid impermeable and vapor permeable, the composite 140 may be used as a back sheet material for disposable diapers and feminine hygiene products (such as catamenials). The resultant composite may be stretched to create breathability.

Typical elastic films 142 include the thermoplastic elastomers such as polyurethane, KRATON, silicone, the polyolefin polymers, and the like.

It will be appreciated that, whether or not the cast film production method is used, the coating of an elastic film 142 onto a nonwoven 40 according to the present invention strongly reduces breakage of the bonding points between the film and the nonwoven or the creation of loose or broken filaments in the nonwoven so long as stretching thereof occurs in the CD. This is because the material of the present invention exhibits an enhanced CD elongation so that it is able to extend in the CD along with the elastic film. Because the nonwovens of the present invention have a reduced elongation in the MD, stretching of a biaxially elastic film in the MD can still cause the breakage of the bonding points or loose or broken filaments in the nonwoven. However, as noted earlier, a high percent elongation in the CD is highly desirable in the diaper art, while a high percent elongation in the MD is not.

Figure 12A:
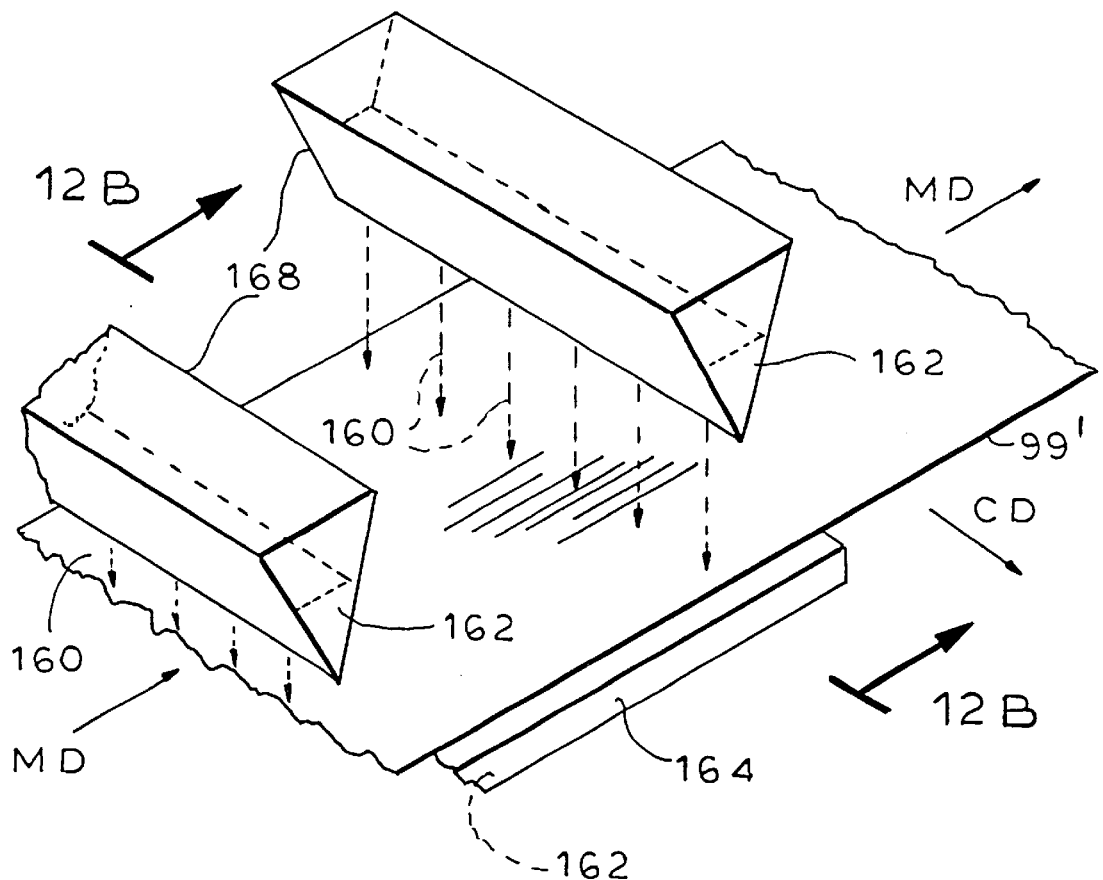
FIG. 12A is a fragmentary isometric view of a nonwoven being hydroformed by water jet.

Referring now to FIG. 12A in particular, in another improved preferred embodiment the process modification is the use, downstream of web formation, of jets 160 of a liquid fluid 162 (such as water) to form a post-web formation flowing stream of moveable spun fibers 20 (from the web) and a liquid 162 with the liquid 162 eventually being received in a liquid discharge box 164 (a form of suction box which operates on liquid s much as a suction box operates on gases, discharging the liquid , e.g., for recirculation). The jets 160 act as needles to tangle the still moveable fibers 20 of the nonwoven 40. The jets 160 do not create perforations in the nonwoven 40, but merely create lanes of higher and lower density, so that the resultant fabric is unapertured.

The pattern screen 99' used in this post-web formation operation is similar to that used in the web formation operation. It is passed between the water jets 160 and the liquid discharge box 164. The fluid permeable member 38 is necessarily liquid permeable for use herein.

Figure 12B:
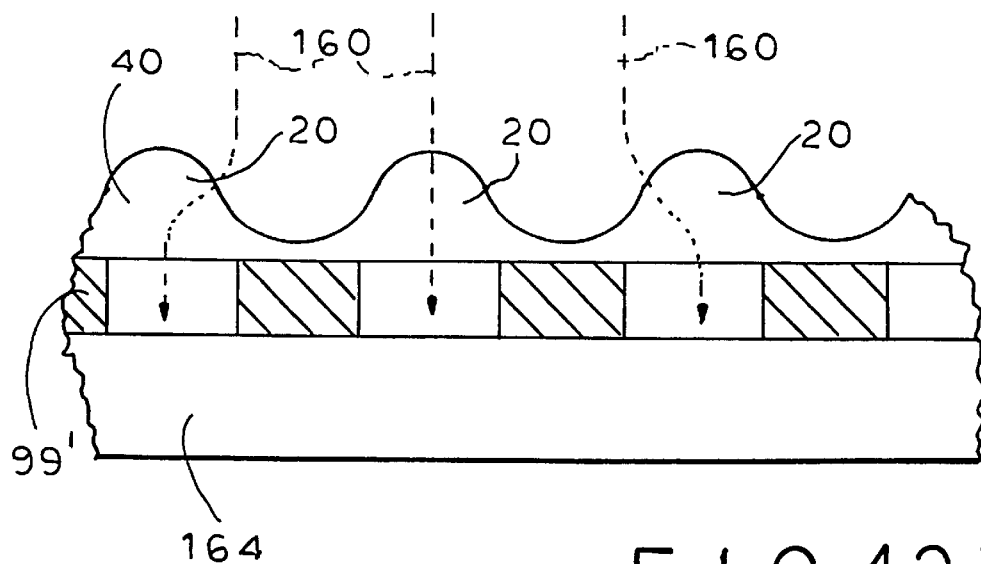
FIG. 12B is a fragmentary view to an enlarged scale taken along the line 12B—12B of FIG. 12A.

The flowing stream of spun fibers 20 and liquid 162 formed after web formation behaves much like the flowing stream of spun fibers 20 and fluid 26 during web formation. As best seen in FIG. 12B, the flowing stream encourages a relatively greater buildup of the spun fibers 20 along the travel path of the stream through the pattern screen 99' and a relatively lesser buildup of the spun fibers 20 where passage of the stream through the pattern screen 99' is blocked. Because the liquid 162 is typically of a higher density and a greater viscosity than the fluid 26, it more easily redirects the fibers in the flowing stream so that a greater concentration of fibers is eventually achieved in the desired high density areas and a lesser density of fibers is achieved in the desired low density areas. Typically the water jets create lanes of higher and lower density than can a like number of air jets, but the dividing line between the higher and lower density lanes is coarser when water jets are used rather than air jets. The price paid for the enhanced redirection of the spun fibers by the liquid is the additional expense involved in circulating (and possibly recirculating) a more dense and more viscous liquid medium 162 (rather than a gaseous medium 26). The presence of liquid jets along the MD plays only a minor role, however, compared to the design of the first pattern screen 99 in defining the high and low density strips.

The liquid 162 used must be relatively pure, must be substantially incompressible, and must be applied at relatively high pressure in order to effect water "entangling" or "spunlace" formation without production problems. For example, de-mineralized water under high pressure is directed by jets onto an unbonded web. The fibers and the filaments get entangled and form a very dense fine structure which provides the necessary strength to the web.

The liquid jets 160 are preferably provided by a wale jet 168 extending across the CD of the nonwoven, and optimally by a series of parallel wale jets 168 being provided at spaced intervals along the MD downstream of web formation. To avoid the formation of apertures in the fabric, the several wale jets 168 should be staggered across the CD so that the liquid jets 160 emerging therefrom do not repeatedly hit the same spot on the fabric and thereby create an aperture rather than the desired variation of density. Where the number of jets 160 in the MD exceeds the number of jets 160 in the CD, a high extensibility and low tensile strength in the CD results. Thus, the wale jets 168 preferably have a short hole-to-hole separation in the MD, relative to a long hole-to-hole separation in the CD, thereby to provide high extensibility and low tensile strength in the CD relative to a low extensibility and high tensile strength in the MD.

It is, of course, necessary to keep the fibers 20 of the fabric 40 "moveable" after web formation on the conveyor (by the air stream 26) and, therefore, the web can only be slightly "pre-bonded" before it passes through the water liquid jets 160 which enhance the lanes of different density along the MD.

The liquid jet system has the additional advantage of being able to split bicomponent fibers—for example, a side-by-side polyester (PET) and polyamide (N)—into monocomponent microfibers and, at the same time, entangle them.

Clearly, two or more of the process modifications described hereinabove may be combined in the formation of a fabric according to the present invention—for example, the closed areas of the pattern screen (e.g., the suction or discharge box cover) may be rhomboids, a liquid may be used to further redirect the loose web fibers after web formation, the strips extending along the length of the fabric in the MD in an alternating pattern may be of varying thicknesses in order to provide liquid flow barriers and liquid flow lanes, and the fabric produced may be a composite of a nonwoven and an elastic polymer film.

As used herein, the term "fiber density pattern" refers to the density pattern of the fabric or the strips of fabric thereof, and not to the density of the various spun fibers.

While several embodiments have been described hereinabove as being made with air as the fluid used adjacent the spinnerette 18 (in order the lengthen and thin the filaments 20), in fact other gases and even other fluids may be used (the term "fluid" encompassing both gases such as air and liquid s such as water). Typically the fluid systems described herein will be air flow systems, and the liquid flow systems will be water flow systems.

The materials of the present invention find utility in a wide variety of industrial applications. For example, the materials are useful as filters for air filtration, car filters, liquid filters and filter bags. The materials are also useful in industrial protective clothing such as clean room apparel, commodity consumer clothing, dust protection and chemical protection. The materials are further useful as industrial wipes such as clean room wipes, oil absorption wipes, lens cleaning wipes, and surface protection for low friction and/or non-scratch surfaces. Other industrial applications for the materials include house wrapping, packaging, furniture and bedding, car covers, insulation, battery separators, shoe components and the like.

Further, the materials of the present invention find utility in a wide variety of hygiene applications. For example, the materials are useful as topsheets, backsheets or outer covers, leg cuffs, waistbands, stretch tabs, elastic or extendable side panels, and acquisition or distribution layers.

Finally, the materials of the present invention also find utility in a wide variety of medical applications. For example, the materials are useful as surgical drapes, surgical gowns, cut-in-place gowns, shoe covers, bouffant caps and sterilization wrapping.

The specification of particular applications hereinabove is to be taken as exemplary only, and not as limiting. Uses other than the aforenoted industrial, hygiene and medical applications follow naturally from the physical and chemical properties of the materials of the present invention.

The high CD elongation materials of the present invention find particular utility in hygienic applications, especially as topsheets, backsheets or outer covers, stretch tabs, elastic or extendable side panels and acquisition or distribution layers.

To summarize, the present invention provides a nonwoven fabric having low tensile and high elongation in the first direction (typically the CD) and high tensile and low elongation in the second direction (typically the MD) and a method of manufacturing same.

Fabrics which are pneumatically treated (i.e., treated with gas) or pneumatically and hydrodynamically treated (i.e., treated with gas and liquid) find particular utility in industrial applications (such as surface protection/low friction layers, packaging, furniture and bedding, car covers and shoe components) as well as hygiene applications (such as top sheets, acquisition/distribution layers, and core wraps).

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A nonwoven fabric of substantially randomly oriented continuous spun fibers formed into a single sheet wherein the density and thickness of the fabric formed by the spun fibers varies between strips of relatively high density and thickness and strips of relatively low density and thickness, the strips extending along the length of the fabric in the machine direction in an alternating pattern with the high density and thickness strips separated from each other by low density and thickness strips, the alternately high density and thickness and low density and thickness strips providing the fabric with a higher percent elongation and a lower liquid flow rate in the cross direction than in the machine direction.

2. A nonwoven fabric made of substantially randomly oriented continuous spun fibers wherein the density of the fabric formed by the spun fibers varies between strips of relatively high density and strips of relatively low density, the high/low density ratio being 1.1–10.0 to 1.0, the strips extending along the length of the fabric in a first direction in an alternating pattern, with the high density strips separated from each other by low density strips, the alternating high density and low density strips providing the fabric with a higher percent elongation in a second direction than in the first direction, the strips defining closed rhomboids elongated in the second direction.

3. The fabric of claim 2 wherein the density ratio is 1.5–3.0 to 1.0.

4. A nonwoven fabric made of substantially randomly oriented continuous spun fibers wherein the density of the fabric formed by the spun fibers varies between strips of relatively high density and strips of relatively low density, the strips extending along the length of the fabric in a first direction in an alternating pattern, with the high density strips separated from each other by low density strips, the alternating high density and low density strips providing the fabric with a higher percent elongation in a second direction than in the first direction, the strips being initially formed by selective fluid flow and then at least partially re-formed by selective liquid flow.

5. The fabric of claim 4 wherein the liquid flow is water flow.

6. A nonwoven fabric made of substantially randomly oriented continuous spun fibers wherein the thickness of the fabric formed by the spun fibers varies between strips of relatively high thickness and strips of relatively low thickness, the strips extending along the length of the fabric in a first direction in an alternating pattern, with the high thickness strips separated from each other by low thickness strips, the high thickness strips acting as fluid flow barriers separated from each other by low thickness strips acting as fluid flow lanes, the alternating high thickness and low thickness strips providing the fabric with a lower fluid flow rate in a second direction than in the first direction.

7. The fabric of claim 6 wherein the thickness of the low thickness strips is 10–90% of the thickness of the high thickness strips.

8. The fabric of claim 6 wherein the thickness of the low thickness strips is 25–75% of the thickness of the high thickness strips.

9. A laminate of
  (A) a nonwoven fabric made of substantially randomly oriented continuous spun fibers wherein the density of the fabric formed by the spun fibers varies between strips of relatively high density and strips of relatively low density, the strips extending along the length of the fabric in a first direction in an alternating pattern, with the high density strips separated from each other by low density strips, the alternating high density and low density strips providing the fabric with a higher percent elongation in a second direction than in the first direction; and
  (B) an elastic polymeric film coated onto the fabric along the first direction.

10. The laminate of claim 9 wherein the elastic polymeric film is cast coated onto the fabric.

* * * * *